United States Patent
Laneryd et al.

(10) Patent No.: US 12,175,171 B2
(45) Date of Patent: Dec. 24, 2024

(54) METHOD FOR OBTAINING AN IMPROVED TRANSFORMER DESIGN FOR A POWER PLANT

(71) Applicant: Hitachi Energy Ltd, Zurich (CH)

(72) Inventors: Tor Laneryd, Enköping (SE); Sebastian Seier, Bad Honnef (DE)

(73) Assignee: HITACHI ENERGY LTD, Zurich (CH)

( * ) Notice: Subject to any disclaimer, the term of this patent is extended or adjusted under 35 U.S.C. 154(b) by 0 days.

(21) Appl. No.: 18/705,768

(22) PCT Filed: Nov. 3, 2022

(86) PCT No.: PCT/EP2022/080681
§ 371 (c)(1),
(2) Date: Apr. 29, 2024

(87) PCT Pub. No.: WO2023/079003
PCT Pub. Date: May 11, 2023

(65) Prior Publication Data
US 2024/0330541 A1    Oct. 3, 2024

(30) Foreign Application Priority Data
Nov. 4, 2021    (EP) ..................................... 21206467

(51) Int. Cl.
*G06F 30/20*    (2020.01)
(52) U.S. Cl.
CPC .................................... *G06F 30/20* (2020.01)
(58) Field of Classification Search
CPC ....................................................... G06F 30/20
(Continued)

(56) References Cited

U.S. PATENT DOCUMENTS 7,081,689 B2 *   7/2006   Tilscher ................ F03D 7/0284
                                                               290/55
9,419,430 B1     8/2016   Tostrud et al.
(Continued)

FOREIGN PATENT DOCUMENTS

CN        102290830 A        12/2011
CN        107066799 A         8/2017

OTHER PUBLICATIONS

International Search Report and Written Opinion of the International Searching Authority, International Application No. PCT/EP2022/080681, mailed Mar. 24, 2023, 17 pages.
(Continued)

*Primary Examiner* — Andre Pierre Louis
(74) *Attorney, Agent, or Firm* — Sage Patent Group

(57) ABSTRACT

A method for obtaining an improved transformer design for a power plant, including the steps of defining one or more critical temperatures ($\theta_{hw}^{normal}$, $\theta_{hw}^{contingency}$, $\theta_h$, $\theta_o$) in the operation of the transformer, determining a limit ($\theta_{hw,max}^{normal}$, $\theta_{hw,max}$ contingency, $\theta h_{,max}$, $\theta_{o,max}$) for at least one of the critical temperatures and obtaining an adjusted design of the transformer by using a data set of transformer loading, the data set comprising the amount of time (H) at a specific load level ($\kappa$) for a specific ambient temperature ($\theta_a$). The method further includes the step of producing a transformer having the adjusted values of the design parameters ($\Delta\theta_{hr}$, $\Delta\theta_{or}$, R, x, y) and/or using a transformer having the adjusted values of the design parameters ($\Delta\theta_{hr}$, $\Delta\theta_{or}$, R, x, y) in the power plant.

9 Claims, 2 Drawing Sheets

Figure 1:
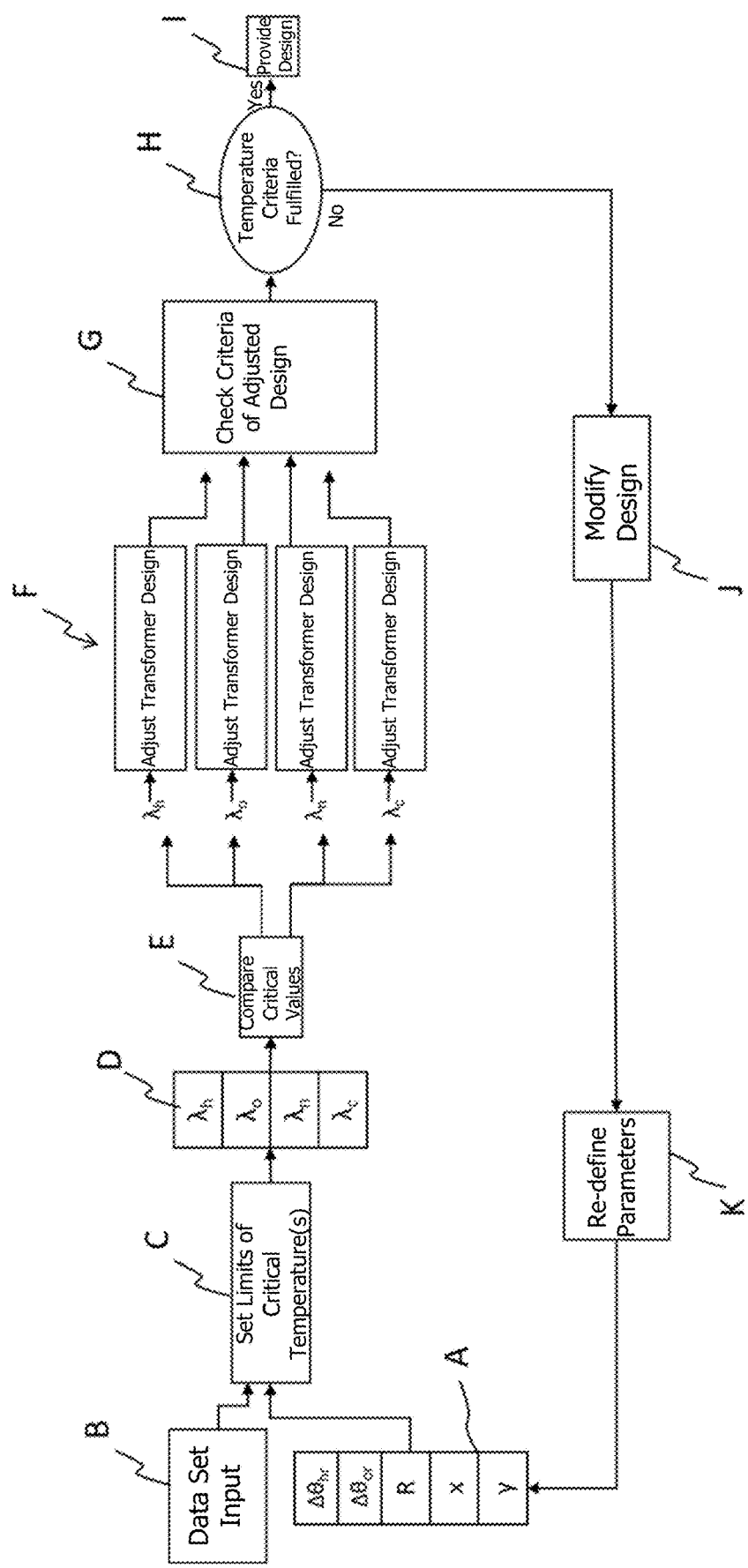

(58) Field of Classification Search
USPC .......................................................... 703/18
See application file for complete search history.

(56) References Cited

U.S. PATENT DOCUMENTS

2020/0067312 A1* 2/2020 Pavlovski ............... H02J 3/003
2021/0327644 A1* 10/2021 Fogelberg ................ H01F 3/02

OTHER PUBLICATIONS

Extended European Search Report, European Application No. 21206467.9, mailed May 9, 2022, 12 pages.
International Preliminary Report on Patentability, International Application No. PCT/EP2022/080681, mailed Feb. 12, 2024, 9 pages.
Mogorovic Marko, et al., "100 kW 10 kHz Medium-Frequency Transformer Design Optimization and Experimental Verification", IEEE Transactions On Power Electronics, Institute of Electrical and Electronics Engineers, vol. 34, No. 2, USA, Feb. 1, 2019, 13 pages.
Arguence Olivier, et al., "Sizing power transformers in power systems planning using thermal rating", International Journal of Electrical Power & Energy Systems, Jordan Hill, Oxford, GB, vol. 118, Dec. 27, 2019, 6 pages.
Kazmi Syed Hamza Hasan, et al., "Thermoelectric Modelling and Optimization of Offshore Windfarm Export Systems—State of the Art", 209 1st Global Power, Energy, and Communication Conference (IEEE GPECOM2019), Jun. 12-25, 2019, Cappadocia, Turkey, 6 pages.
Kazmi Syed Hamza Hasan, et al., "Cost optimized dynamic design of offshore windfarm transformers with reliability and contingency considerations—ScienceDirect", International Journal of Electrical Power & Energy Systems vol. 128, Jun. 1, 2021, 29 pages.
Kazmi Syed Hamza Hasan, et al., "Cost optimized dynamic design of offshore windfarm transformers with reliability and contingency considerations", International Journal of Electrical Power and Energy Systems, 2021, 14 pages.
Kazmi Syed Hamza Hasan, et al., "Dynamic Thermoelectric Modelling of Oil-filled Power Transformers for Optimization of Offshore Windfarm Export Systems", Cigre, Symposium Aalborg, Denmark, Jun. 4-7, 2019, 10 pages.
International Standard, "Power transformers—Part 7: Loading guide for oil-immersed power transformers", IEC 60076-7, First Edition, Dec. 2005, 64 pages.
T. Laneryd, et al., "Dynamic thermal behaviour of wind power transformers", Cigre Session 48, Paris, France, 2020, 9 pages.
Turnell, Alice Vieira, et al., "Risk and economic analysis of utilizing dynamic thermal rated transformer for wind farm connection", 2018, European Union, 6 pages.
Mogorovic, et al. "100KW, 10KHz Medium Frequency Transformer Design Optimization and Experimental Verification," IEEE Transactions on Power Electronics, Feb. 28, 2019, 14 pages.
Arguence, et al. "Sizing power transformers in power systems planning using thermal rating," Electrical Power and Energy Systems 118 (2020) 105781, Univ. Grenoble Alpes, CNRS, Grenoble, France, Dec. 31, 2020, 6 pages.
Kazmi, et al. "Cost optimized dynamic design of offshore windfarm transformers with reliability and contingency considerations," Electrical Power and Energy Systems 128 (2021) 106684, International Journal of Electrical Power and Energy Systems, Denmark, Jan. 8, 2021, 14 pages.
Office Action for Chinese Invention Patent Application No. 2022800737133, mailed Sep. 28, 2024, 7 pages.

* cited by examiner

METHOD FOR OBTAINING AN IMPROVED TRANSFORMER DESIGN FOR A POWER PLANT

CROSS-REFERENCE TO RELATED APPLICATIONS

This application is a 35 U.S.C. § 371 national stage application of PCT International Application No. PCT/EP2022/080681 filed on Nov. 3, 2022, which in turn claims priority to European Patent Application No. 21206467.9, filed on Nov. 4, 2021, the disclosures and content of which are incorporated by reference herein in their entireties.

The present disclosure relates to a method for obtaining an improved transformer design for a power plant. The transformer may be utilized in a renewable energy grid connection. As an example, the transformer may be utilized in a wind power plant.

Conventional transformers are designed for a power rating representing a typical steady load and the ability to handle higher loads during emergencies. The transformers are typically designed with a nameplate rating of maximum apparent power at maximum ambient temperature.

Renewable energy plants, however, are characterized by a highly variable load and a limited maximum load corresponding to the installed power generation. When using conventionally designed transformers for renewable energy grid connection, the transformers are loaded considerably less than their loading capacity. Thus, the transformers are over-dimensioned, i.e., bulkier and more expensive than needed.

Several reasons lead to the over-dimensioning. First of all, the nameplate rating is usually set including a budget for emergency loading that does not occur for renewable collection grids. Furthermore, the renewable power generation depends on weather conditions that improve the cooling performance. As an example, higher wind power generation is provided at low ambient temperature. Furthermore, load variations and transformer thermal inertia means that temperatures are always far from steady state limits. Furthermore, the maximum active power does not necessarily coincide with maximum reactive power. Furthermore, the capacity factor is much lower than in conventional transformers. Furthermore, there is limited value in retaining high insulation life after the end of life of the renewable power plant.

The publication by S. H. H. Kazmi et al, "Cost optimized dynamic design of offshore windfarm transformers with reliability and contingency considerations" (International Journal of Electrical Power and energy Systems, 2021) discloses a method for optimizing the design of offshore windfarm transformers.

Embodiments of the disclosure relate to a method for obtaining an improved transformer design.

According to an aspect of the disclosure, a method for obtaining an improved transformer design for a power plant is disclosed. The method may comprise producing the transformer with the improved design. In particular, a manufacturing machine may be controlled such that the transformer having the improved design is obtained. The manufacturing machine may be controlled by a processor configured to run an algorithm for obtaining improved design parameters for a transformer. The method may comprise using a transformer having the improved transformer design in the power plant.

In the method for obtaining an improved transformer design for a power plant one or more critical temperatures in the operation of the transformer are defined. For at least one of the critical temperatures, a limit is defined. The limit may be defined by material parameters of the transformer and an expected life time, for example.

Furthermore, a data set of transformer loading is provided. The data set may be an input to the processor. The data set may comprise for one or more transformers or a power plant the amount of time at a specific load level for a specific ambient temperature. The data set can be provided by an operator or developer of a power plant, for example. The data set can be data obtained over a representative number of years during the operation of a power plant.

In a further method step, expressions for one or more of the critical temperatures in dependence from the load level and in dependence from design parameters related to a geometrical and/or an electrical design of a transformer are provided. The expression may be an input to the processor or may be a value stored in the processor.

Then, the geometrical and electrical design of the transformer is adjusted and adjusted values for one or more of the design parameters are obtained such that the expression for at least one of the critical temperatures is closer to the determined limit than for the previous design of the transformer. The design may be adjusted such that the value obtained from the expression equals the determined limit or differs at most by 50° C. from the determined limit. As an example, the difference may be at most 10° C.

As an example, adjusting the geometrical design may comprise changing length, width, height, cross section, for example, of components inside the transformer, including windings, core, tank, cooling equipment. It is also possible to choose different materials. Adjusting the electrical design may comprise changing winding type from disc winding to layer winding, for example. As parameters may be correlated to each other, adjustment of one specific parameter may require adjustment of further parameters. Obtaining values for design parameters may be done with standard simulation tools such as circuit models, finite element models, empirical relations, for example.

By adjusting specific geometrical and electrical design parameters, also adjusted characteristic design parameters of the transformer are obtained.

When having arrived at the adjusted values, a transformer having the improved design may be produced. It is also possible that a transformer according to the improved design is selected among a plurality of transformers of different design and used in the power plant. The method can also be used for verifying that a transformer fulfills the design criteria for use in a power plant when transformer load levels for the specific power plant are provided.

The method allows obtaining a transformer design in which the limits for critical temperatures are observed. Before construction of the power plant, the expected power generation and the limited life time of components such as generators are usually known. By using this information in the design process of the transformer for the grid connection, the transformer can be made cheaper and more compact. The expected load and ambient temperature are used as input data for suitably sizing the transformer.

The improved transformer design may be such that the size and/or the rating of the transformer is as small as possible. The limits of the critical temperature calculated from the improved design of the transformer may be as close as possible to the determined limit. As an example, the limit of the critical temperature rise over ambient of the improved design may differ at most by 10° C. from the determined limit.

In case that only one critical temperature with one limit has been defined, the adjusted design may be accepted as the improved design. It is also possible that other criteria are checked before accepting the design and in case that further criteria are not fulfilled, further adjusting the design and iterating the method until all criteria are fulfilled. The iteration may start by providing the expressions and setting the design parameters to the adjusted design parameters.

In case that several critical temperatures with temperature limits are defined, the method may comprise the step of checking if all other limits for the critical temperatures are observed by the adjusted design, i.e., checking if all other limits are below or equal to their respective limits. Also other criteria may be checked. If the criteria are not fulfilled, the design may be further adjusted until all limits are observed and the method is iterated until all criteria are fulfilled. The iteration may start by providing the expressions and setting the pre-defined design parameters to the adjusted design parameters. When all criteria are fulfilled, the design is accepted.

As an example, the critical temperatures may comprise at least one of a weighted hotspot temperature at normal load and a weighted hotspot temperatures at contingency load. Both of these critical temperatures may be defined in the method. Operating the transformer at contingency load means that one of the other transformers of the power plant is out of operation such that the full load of the power plant is redistributed on the remaining transformers.

Furthermore, the critical temperatures may comprise at least one of a top liquid temperature and a hot spot temperature at maximum load and maximum ambient temperature.

The data set of transformer loading may be provided as the amount of time for a number of ambient temperature discretization steps and a number of load discretization steps. The sum over the amount of time may equal the number of hours in a year. A different time interval than hours is possible.

The obtained improved transformer design may be configured for a renewable energy plant. As an example, the transformer may be used in a wind power plant.

According to a further aspect, a transformer having an improved design obtainable by the method of any of the preceding claims is disclosed. As an example, at least one critical temperature calculated by the expression in step with the load level of the transformer or the power plant including the transformer as input data and with the design parameters of the transformer equals or differs at most 50° C. from a determined limit. The difference may be at most 10° C.

The present disclosure comprises several aspects and embodiments. Every feature described with respect to one of the aspects and embodiments is also disclosed herein with respect to the other aspects and embodiments, even if the respective feature is not explicitly mentioned in the context of the other aspect and embodiment.

Further features, refinements and expediencies become apparent from the following description of the exemplary embodiments in connection with the figures. In the figures, elements of the same structure and/or functionality may be referenced by the same reference signs. It is to be understood that the embodiments shown in the figures are illustrative representations and are not necessarily drawn to scale.

Figure 2:
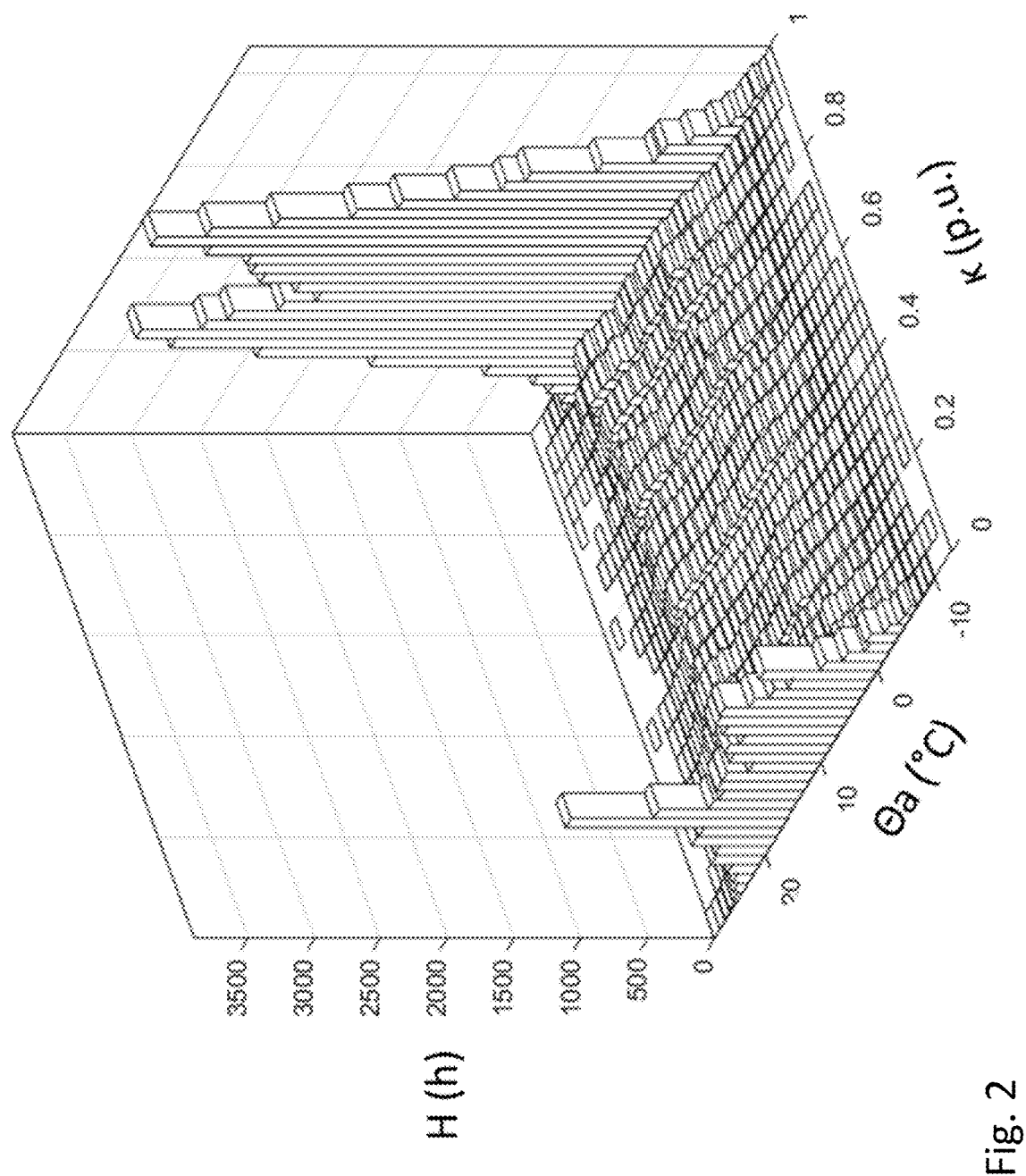

FIG. 1 is a schematic flow diagram of a method for obtaining an improved transformer design, FIG. 2 is an example of a table of transformer loading data.

FIG. 1 shows a flow diagram of a method for obtaining an improved transformer design. The method may be used for transformers in wind power applications. As an example, the method may be used for offshore, marine or subsea wind power applications. It can also be used for other applications, in particular renewable energy grid connections such as solar power.

The method may allow selecting a suitable rating of a transformer for dynamic overload. In this context, dynamic loading means that the transformer is subjected to varying loads that may exceed the load according to transformer rating. For dynamic overloading, the overload temperature limits are higher than the temperature limits for normal cycling loading.

In the method, absolute temperature limits, in particular absolute temperature limits for dynamic overloading are defined. The temperature limits may be defined according to long-term emergency temperature limits in national and international industry standards, for example IEC 60076-7 and IEC 60076-14. IEC 60076-7 states that long-term emergency loading may persist for weeks or months, and the negative effects are listed as ageing of conductor insulation, ageing of other insulation, increased tap-changer contact resistance and gasket materials becoming brittle.

It is assumed that tap-changer and gasket materials are selected according to their respective temperature environment when the conductor insulation reaches its long-term emergency temperature limit and that other insulation material has a lower temperature than the conductor insulation. The sizing for dynamic overloading is therefore only based on the ageing of the conductor insulation as well as the absolute temperature limits.

For applications where there is limited experience with high-temperature operation, lower temperature limits than the long-term emergency limits could be selected while gaining such experience.

By the method, an improved transformer with a suitable rating can be obtained. In the following, the meaning of the term "rating of a transformer" is explained.

In a power plant, e.g., a wind power plant, the load level κ of the wind farm can be defined as $$\kappa = \frac{s}{S} \quad (1)$$

In the above equation, s is the apparent power output of the wind farm at a specific time and S=max(s) is the maximum apparent power output of the wind farm.

The load level κ will vary between 0 and 1 during operation. This load is assumed to be split between a total of N transformers in the power plant, each transformer having a power rating r. The rating of the transformer can be considered according to IEC or any other relevant standard. The power rating r can be defined as the power output the transformer is capable of delivering continuously at a specified rated voltage without exceeding internal temperature limits.

The load level K of each transformer, i.e., the ratio of apparent power output of each transformer at a specific time and the maximum apparent power output of each transformer during normal operation is $$K = \frac{1}{r} \cdot \frac{S}{N} \cdot \frac{s}{S} = \frac{s}{r \cdot N} \quad (2)$$

The maximum load level of a transformer with rating r is $$\max(K) = \frac{\max(s)}{r \cdot N} = \frac{S}{r \cdot N} \quad (3)$$

If the transformer rating r is chosen as r=S/N, then the load level K will vary from 0 to 1, but this will not be the case in general. A typical grid connection will be designed with (N−1) redundancy to ensure continued dispatch of the output of the entire grid connection even if one transformer is out of operation without exceeding the transformer rating. The rating for a transformer with (N−1) redundancy is $$r_{(N-1)} = \frac{S}{N-1} \quad (4)$$

The maximum load level during normal operation of a transformer with (N−1) redundancy, as obtained from equations (4) and (5), is:

$$\max(K_{(N-1)}) = \frac{S}{r_{(N-1)} \cdot N} = \frac{N-1}{N} \quad (5)$$

The dynamic overload factor $\lambda$ can be defined as the ratio of maximum load level of a transformer with rating r compared to a transformer with rating r(N−1)

$$\lambda = \frac{\max(K)}{\max(K_{(N-1)})} = \frac{S}{r \cdot N} \cdot \frac{N}{N-1} = \frac{S}{r \cdot (N-1)} \quad (6)$$

The load level $K_{normal}$ of a transformer with rating r during normal operation as provided in equation (2) can be expressed through the overload factor $\lambda$ as $$K_{normal} = \frac{s}{r \cdot N} = \frac{s}{r \cdot N} \cdot \frac{S}{S} \cdot \frac{N-1}{N-1} = \lambda \cdot \frac{N-1}{N} \cdot \kappa \quad (7)$$

During contingency operation, i.e., when one transformer is out of operation, the full load of the wind farm will be distributed on the remaining (N−1) transformers. The load level $K_{contingency}$ of a transformer with rating r during contingency operation is $$K_{contingency} = \frac{N}{(N-1)} K_{normal} = \lambda \cdot \kappa \quad (8)$$

As can be seen from Eq. (6), determining the rating of the transformer is equivalent to determining $\lambda$ when the number of transformers and the maximum apparent power output of the power plant is known.

In the following, the method is described with reference to the routine as shown in FIG. 1. In step A), parameters related to a specific transformer design are defined. The characteristic parameters may be as follows:
$\Delta\theta_{hr}$: hot-spot-to-top-liquid gradient at rated current
$\Delta\theta_{or}$: top liquid temperature rise at rated losses
R: ratio of load losses to no-load losses at rated conditions
x: liquid exponent depending on cooling mode
y: winding exponent depending on cooling mode In this regard, top liquid or top oil temperature is the measured liquid temperature at the top of the transformer, corresponding to the maximum liquid temperature in the transformer since hot liquid moves upwards because of buoyancy. Top liquid temperature rise means that the ambient temperature is subtracted from the measured liquid temperature to make the value independent of the ambient temperature. As usually thermal tests are conducted without applying voltage, $\Delta\theta_{or}$ is provided at rated losses because there are additional losses (no-load losses) that are related to the voltage and also contribute to the liquid temperature rise.

The hot-spot temperature is the maximum temperature in the transformer winding. This value can be either measured or estimated. Hot-spot-to-top-liquid-gradient means that the top liquid temperature is subtracted from the measured or estimated hot spot temperature. $\Delta\theta_{hr}$ is provided at rated current because there are no voltage induced losses in the winding.

The loss ratio R is the ratio of load losses (based on current) to no-load losses (based on voltage). x and y are modelling coefficients that describe how $\Delta\theta_{hr}$ and $\Delta\theta_{or}$ change for loads different than the rated power.

Furthermore, limits of one or more critical temperatures in the operation of the transformer are defined. The critical temperatures may be calculated both at normal operation and at contingency operation. As an example, temperature limits for the weighted hot spot temperature for normal load $\theta_{hw}^{normal}$ and contingency load $\theta_{hw}^{contingency}$ are defined. As an example, these limits can be calculated from an ageing model of IEC 60076-7 Annex A as follows:

$$\frac{1}{DP_{end}} - \frac{1}{DP_{start}} = A \cdot 8766 \cdot C \cdot \exp\left(-\frac{E_A}{R_g \cdot (\theta_{hw}^{contingency} + 273)}\right) + \quad (9)$$

$$A \cdot 8766 \cdot (L-C) \cdot \exp\left(-\frac{E_A}{R_g \cdot (\theta_{hw}^{normal} + 273)}\right)$$

In the above equation, $DP_{start}$ is the initial degree of polymerization and $DP_{end}$ is the degree of polymerization marking the end of life. The initial degree of polymerization depends on the manufacturing process but can typically be taken as $D_{start}$=1000. The end of life criteria is typically defined as $DP_{end}$=200. Generally, the degree of polymerization describes aging of solid insulation material of the transformer. The solid insulation material may comprise cellulose that includes long polymeric chains, wherein the mechanical strength reduces over time due to polymerization. The aging is accelerated at high temperature or in the presence of moisture or oxygen.

Furthermore, A and $E_A$ are material parameters. In particular A and $E_A$ are ageing parameters based on the type of the solid insulation material, moisture level and oxygen level. Under the assumption of a thermally upgraded paper at 1.5% moisture with low oxygen, A=3.0 $10^4$ h$^{-1}$ and $E_A$=86 KJ/mol. L is the total lifetime of the transformer, which is to be specified by the operator of the grid connection. As an example, L=36 years. A subset of L denoted as C is the number of years that the transformer is assumed to operate at contingency level. As an example, L=1 years. The remaining time, the transformer is assumed to operate at normal level. In this example, L−C=35 years.

Seasonal variations can be considerable. Therefore, it may be beneficial to express L and C as integer number of years. In particular, weather conditions are different in winter and summer, leading to different stress of the transformer in winter and summer. When providing C as an integer number, the differences between winter and summer can be disregarded in the parameter.

Different values of the weighted hot spot temperature is provided for contingency and normal load.

Assuming that 20% of the lifetime of the transformer can be expended at contingency load, then the maximum weighted hot spot temperature is:

$$\theta_{hw,max}^{contingency} = -\frac{E_A}{R_g}\ln\left(0.2 \cdot \frac{1}{(C \cdot 8766 \cdot A)}\left(\frac{1}{DP_{end}} - \frac{1}{DP_{start}}\right)\right)^{-1} - 273 = 117.0° \text{ C}. \quad (10)$$

For normal load, the maximum weighted hot spot temperature is:

$$\theta_{hw,max}^{normal} = -\frac{E_A}{R_g}\ln\left(0.8 \cdot \frac{1}{(L-C) \cdot 8766 \cdot A}\left(\frac{1}{DP_{end}} - \frac{1}{DP_{start}}\right)\right)^{-1} - 273 = 87.6° \text{ C}. \quad (11)$$

These values are independent of loading data and geometry of the transformer. They only depend on the specified lifetime, specified operation at contingency level and material parameters.

It is noted that the obtained weighted average value of hotspot temperature for normal load is lower than 98° C., which is the arithmetic average of hotspot temperature of a transformer with 78 K temperature rise in accordance with IEC and a 20° C. yearly average ambient temperature. This is because the weighted average puts more weight on higher temperatures. Furthermore, according to IEC 60076-7 appendix A, the lifetime of thermally upgraded paper at a constant temperature of 98° C. and with 1.5% moisture is less than 20 years, so the temperature has to be decreased to achieve an expected life of the wind farm of more than 20 years.

Further temperature limits can be defined from standards, such as IEC and IEEE, for different combinations of liquid and solid insulation material in the transformer. As an example, a temperature limit $\theta_{h,max}$ for the hot-spot temperature and a temperature limit $\theta_{o,max}$ for the top-liquid temperature can be defined.

Then, in step B) of the method, a data set of transformer loading is provided as an input. The data set specifies the amount of time one or more transformers or the power plant is at a specific load level for a specific ambient temperature. The data set can be provided by an operator or developer of a power plant, for example. The data set can be data obtained over a representative amount of time such a representative number of years.

FIG. 2 shows an example of a respective data set. The data set is in the form of a two-dimensional histogram of the number N of hours per year the power plant is or is expected to be at a certain load level κ for a certain ambient temperature $\theta_a$. It is also possible that the data set is the loading for only one transformers or for several transformers in the power plant.

The number of load discretization steps is denoted as $n_\kappa$ and the number of ambient temperature discretization steps is denoted as $n_{\theta a}$. The sum of hours must be equal to the number of hours in a year, i.e., $$\sum_{n\kappa}\sum_{n\theta_a} H(\kappa, \theta_a) = 365.25 \times 24 = 8766 \quad (12)$$

The number of load discretization steps and number of ambient discretization temperature steps can be selected in agreement with the customer, for example. In the specific example shown in FIG. 2, an ambient temperature discretization step of 1° C. and a load discretization step of 0.05 is used. Maximum and minimum temperature depend on the load data. In the shown data set, the ambient temperature varies between −13° C. and 29° C. This results in $n_\kappa$=20 and $n_{\theta a}$=42.

In a further step C), limits of one or more critical temperatures in the operation of the transformer are set. These limits can be set both for normal operation and for contingency operation.

Then, the critical temperatures are expressed in dependence from the loading data and the parameters related to the design of the transformer. In specific cases, the expression further depend on a parameter connected to the rating of the transformer.

In case that the expressions contain a parameter connected to the rating of the transformer, the critical temperatures in the expressions are set to their limits, whereby critical values for the parameter connected to the rating of the transformer can be obtained for each of the temperatures.

In particular, in step C), weighted hotspot temperatures $\theta_{hw}$ for normal load and contingency load can be calculated in dependence from the load data as follows:

$$\theta_{hw} = \left(-\frac{R_g}{E_A}\ln\frac{1}{8766}\sum_{n\kappa}\sum_{n\theta_a} H(\kappa, \theta_a) \cdot \exp\left(\left(-\frac{E_A}{R_g(\theta_h + 273)}\right)\right)\right)^{-1} - 273 \quad (13)$$

In this equation, $E_A$ is the activation energy, equaling 86×10³ J/mol and $R_g$ is the gas constant, equaling 8.314 J/mol/K.

In the expression, $\theta_h$ is the transformer hotspot temperature, which can be calculated for each load level and ambient temperature level according to a dynamic thermal model such as the IEC 60076-7 dynamic thermal model as:

$$\theta_h = \theta_a + \Delta\theta_{or} \cdot \left(\frac{1 + K^2 R}{1 + R}\right)^x + \Delta\theta_{hr} \cdot K^y \quad (14)$$

In this equation, $\theta_a$ is the ambient temperature, $\Delta\theta_{or}$ is the top-liquid temperature rise at rated current, K is the load level of the transformer and R is the ratio of load losses to no-load losses at rated conditions. Accordingly, $\theta_h$ and $\theta_{hw}$ depends on the load level and design parameters of the transformer.

It is noted that the hotspot temperature for each load level is calculated as steady state value and an expression comprising this hotspot temperature is multiplied by the number of hours at that load level in Eq. (13). This method disregards the thermal inertia, i.e., that the temperature of the transformer depends not only on the immediate load but also on previous loading. However, the analysis is done over long periods of time and includes both load increases and load decreases. Assuming that the process of lead increase and load decrease are sufficiently similar, the errors from disregarding thermal inertia will cancel out.

Other methods such as a thermohydraulic network model or CFD (computational fluid dynamics) can also be used to evaluate the hotspot temperature for each load level and ambient temperature level. If accuracy is the only consideration, CFD is most suitable. However, as CFD is time consuming and the ageing of lower temperature is much less and, therefore of less relevance, it can be sufficient to check CFD results for higher temperature levels, while generally using the IEC dynamic thermal approach.

For normal load, the load level K of a transformer in eq. (14) can be expressed by the load level $\kappa$ of the input data multiplied by a factor $N-1/N\lambda$, wherein N is the number of transformers in the power plant and $\lambda$ is the dynamic overload factor, according to eq. (7). $\lambda$ is related to the transformer rating according to eq. (6), with $$\lambda = \frac{S}{r \cdot (N-1)}.$$

The transformer hotspot temperature for normal load for the adjusted design can then be expressed as:

$$\theta_h^{normal} = \theta_a + \Delta\theta_{or} \cdot \left(\frac{1 + \left(\frac{N-1}{N}\lambda\kappa\right)^2 R}{1+R}\right)^x + \Delta\theta_{hr} \cdot \left(\frac{N-1}{N}\lambda\kappa\right)^y \quad (15)$$

For contingency load, the load level K of a transformer in eq. (14) can be expressed by the load level $\kappa$ of the input data multiplied by $\lambda$, according to eq. (8).

Then, the transformer hotspot temperature for an adjusted design for contingency load can be expressed as:

$$\theta_h^{contingency} = \theta_a + \Delta\theta_{or} \cdot \left(\frac{1 + (\lambda\kappa)^2 R}{1+R}\right)^x + \Delta\theta_{hr} \cdot (\lambda\kappa)^y \quad (16)$$

In above equations (15) and (16), the transformer temperatures $\theta_h^{normal}$ and $\theta_h^{contingency}$ are expressed as a function of the dynamic overload factor $\lambda$ depending on load $\kappa$ and ambient temperature $\theta_a$ obtained from the input data set.

From equation (13), when the transformer temperature $\theta_h$ is replaced by $\theta_h^{normal}$ and $\theta_h^{contingency}$, the weighted hotspot temperature for normal load $\theta_{hw}^{normal}$ and the weighted hotspot temperature for contingency load $\theta_{hw}^{contingency}$ are obtained as a function of the dynamic overload factor A.

Then, when setting $\theta_{hw}^{normal}$ and $\theta_{hw}^{contingency}$ in these equations to the temperature limits obtained from equations (10) and (11), in step D), critical values $\lambda_n$ and $\lambda_c$ for the dynamic overload factor $\lambda$ can be determined for which the weighted hotspot temperature at normal load and contingency load is at the pre-defined limit. This is equivalent to obtaining critical values $r_n$ and $r_c$ for the respective ratings.

Likewise, the top liquid temperature $\theta_o$ at maximum load and the hot spot temperature $\theta_h$ at maximum load can be expressed in dependence from $\lambda$ as follows:

$$\theta_o = \theta_{a,max} + \Delta\theta_{or} \cdot \left(\frac{1 + (\lambda\kappa_{max})^2 R}{1+R}\right)^x \quad (17)$$

$$\theta_h = \theta_{a,max} + \Delta\theta_{or} \cdot \left(\frac{1 + (\lambda\kappa_{max})^2 R}{1+R}\right)^x + \Delta\theta_{hr} \cdot (\lambda\kappa_{max})^y \quad (18)$$

with the parameters defined as follows:
$\theta_{a,max}$: maximum ambient temperature
$\kappa_{max}$: maximum load level of transformer
$\Delta\theta_{hr}$: hot-spot-to-top-liquid gradient at rated current
$\Delta\theta_{or}$: top-liquid temperature rise at rated losses
R: ratio of load losses to no-load losses at rated conditions
x: liquid exponent depending on cooling mode
y: winding exponent depending on cooling mode.

In a further method step E), the critical values $\lambda_c$, $\lambda_n$, $\lambda_o$ and $\lambda_h$ for the dynamic overload factor $\lambda$ are compared and the dynamic overload factor $\lambda$ is set to the lowest one of the critical values.

After that, depending on the selected critical value of the dynamic overload factor $\lambda$, in step F), the design of the transformer is adjusted. When the critical value is $\lambda_h$, the design is adjusted to the maximum hot-spot limit for maximum load and maximum ambient temperature. When the critical value is $\lambda_o$, the design is adjusted to the maximum top-liquid limit for maximum load and maximum ambient temperature. When the critical value is $\lambda_n$, the design is adjusted to the maximum hot spot limit for nameplate rating. When the critical value is $\lambda_c$, the design is adjusted to the maximum hot spot limit for maximum load and maximum ambient temperature. Adjusting the design means determining geometrical and electrical parameters that fulfill the critical criteria, while allowing other criteria to exceed their respective limits.

As an example, the critical value $\lambda_h$ may be used to calculate a suitable rating and then the design process is used to ensure that the hotspot temperature is as close as possible to the limiting value for this rating. As an example, the limit of the critical temperature rise over ambient of the improved design may be equal to or differ at most by 10° C. from the determined limit. It may also be sufficient that the obtained value is closer to the determined limit than for the previous design.

It is also possible to use as the input data directly the load level K for normal load and/or contingency load of a single transformer and express the critical temperatures in dependence from the load level $\kappa$ without the factor $\lambda$. Also in this case, the design can be adjusted such that at least one critical temperatures obtained from the equations is as close as possible to its temperature limit.

After that, in step G) it is checked that in the adjusted design the other criteria are fulfilled, i.e., the temperatures do not exceed their respective limits. Also other criteria may be checked.

In step H), when all temperature criteria are fulfilled the process ends and a suitable design characterized by relevant design parameters is provided in step I). A transformer according to the design is produced, tested and used in the power plant. It is also possible that a transformer according to the improved design is selected among a plurality of transformers of different design and used in the power plant.

If in step H) not all the temperature criteria are fulfilled, the design is further modified in step J) until all temperature criteria are fulfilled. This means that the critical temperatures do not exceed their limits.

After that, in step K) the parameters $\theta\Delta_{hr}$, $\Delta\theta_{or}$, R, x, y are re-defined in accordance with the modified design. Hereby, $\Delta\theta_{hr}$, $\Delta\theta_{or}$, R are defined based on nameplate rating, x is defined based on contingency load top liquid with same ambient as nameplate and y is defined based on contingency load hot spot with same ambient as nameplate.

A specific example is given in the following.

A transformer having a design characterized by the following characteristic parameters is provided:

$\Delta\Theta_{hr}$: 18 K
$\Delta\theta_{or}$: 60 K
R: 10
x: 0.8
y: 1.3

The values of the characteristic parameters may be chosen as standard values. $\Delta\theta_{hr}$ and $\Delta\theta_{or}$ are chosen to coincide with rated temperature rise limits according to IEC 60076-2. R, x, y, are standard values listed in IEC 60076-7.

Loading data according to FIG. 2 and ageing parameters according to the values obtained in eq. (10) and (11) are provided. The maximum allowed top oil temperature is 115° C. and the maximum allowed hotspot temperature is 140° C. The critical temperatures are defined as in IEC 60076-7, for example.

By expressions (13)-(16), a dependency of critical temperatures from the transformer load levels and from the characteristic design parameters is provided. When setting the critical temperatures to the determined limits, and using the transformer load levels and characteristic design parameters, critical values for the dynamic overload factor $\lambda$ can be obtained. Then, the transformer rating is determined by the lowest one of the dynamic overload factors in expressions (13)-(16).

In the example, the following critical values for the dynamic overload factor $\lambda$ are obtained:

| Criteria: | Critical value for $\lambda$: |
| --- | --- |
| Ageing during normal operation | $\lambda_n = 1.4216$ |
| Ageing during contingency operation | $\lambda_c = 1.3234$ |
| Maximum top oil temperature during contingency operation | $\lambda_o = 1.2748$ |
| Maximum hotspot temperature during contingency operations | $\lambda_h = 1.2773$ |

The rating is determined by the lowest dynamic overload factor, which is $\lambda_o$. The geometric and electric design of the transformer is adjusted to achieve that the calculated critical temperature matches the critical temperature limit at rated conditions. Accordingly, a transformer having the adjusted design has a dynamic overload factor and rating as determined by the lowest dynamic overload factor.

In the specific embodiment, the adjusted values for the design parameters are obtained such that the top oil temperature during contingency operation as obtained from expression (16) equals the determined limit. It may also be sufficient that the top oil temperature is closer to the determined limit than for the previous design of the transformer or such that the expression or differs at most by 50° C. from the determined limit.

Some parameters can be adjusted incrementally (e.g., length, width) while other parameters (e.g., choice of material) can only take discrete values. As the parameters can be correlated to each other (e.g., tank height and transformer core height), adjustment of one specific parameter may require adjustment of a further specific parameter. The adjustment can be done by using well-known simulation tools.

After having arrived at an adjusted design, new characteristic design parameters can be obtained from the adjusted electrical and geometrical parameters.

Finally, it is checked if all limits for the critical temperatures are observed with the adjusted design. In this step, the adjusted characteristic design parameters can be used in equations (13)-(16).

In the case that all further criteria are fulfilled and the iteration is finished, a suitable rating can then be calculated. Assuming that the apparent power of a wind farm is 800 MVA, with N=4 transformers, the suitable rating can be obtained from Eq. (6) as 800 MVA/1.2748/3=209.2 MVA. Accordingly, a rating of approximately 210 MVA is suitable.

In case that not all limits for the critical temperatures are observed, the method is iterated by setting the characteristic parameters to their adjusted values.

As an example, the characteristics parameters of the adjusted transformer design is different from the original assumption. The characteristic parameters can be obtained from the adjusted geometric and electric parameters by standard simulation tools. For example, the new characteristic parameters may be:

$\Delta\theta_{hr}$: 18 K
$\Delta\theta_{or}$: 60 K
R: 10
x: 0.8
y: 1.6

Accordingly, the characteristic parameter y changed from 1.3 to 1.6 in the new design.

While the new design fulfills the temperature limits for the rated conditions in accordance with the formulated expressions, evaluation of equation (14) at full load (K=266.67/210=1.27) with the actual transformer characteristics will show that the hot spot temperature exceeds 140° C. Therefore, the method will be iterated with the new characteristic parameters until all criteria are fulfilled.

The size of the transformer can be further reduced by using high-temperature materials with higher temperature limits. Suitable materials may comprise a thermally upgraded paper or aramid paper, for example. Also lower moisture level may be guaranteed in the transformer. Furthermore, impregnating liquids with higher temperature limits, for instance synthetic or natural ester, may be used in the transformer. In this case, the ageing criteria can become less restrictive, so that the transformer can be more compact with the same rating as when using materials with lower temperature limits. Furthermore, it is also possible that by using different materials, such as ester-filled transformers instead of mineral oil-filled transformers the rating obtained in the process can be further reduced.

REFERENCE SIGNS

S apparent power output of power plant
S maximum apparent power output of power plant
K load level of power plant
K load level of transformer
N number of transformers in grid connection
r rating of transformer
$\lambda$ factor
H number of hours
$\theta_a$ ambient temperature
$n_K$ number of load discretization steps
$n_{\theta a}$ number of ambient temperature discretization steps
D transformer design
$\Delta\theta_{hr}$ hot-spot-to-top-liquid gradient at rated current
$\Delta\theta_{or}$ top-liquid temperature rise at rated losses
R ratio of load losses to no-load losses at rated conditions
x oil exponent depending on cooling mode
y winding exponent depending on cooling mode $DP_{start}$ initial degree of polymerization
$DP_{end}$ degree of polymerization at end of lifetime
L specified lifetime of transformer
C specified subset of lifetime in which transformer operates at contingency level
$E_A$ activation energy
$R_g$ gas constant
$\theta_h$ hot-spot temperature
$\theta_o$ liquid temperature
$\theta_{hw}^{normal}$ weighted hotspot temperatures for normal load
$\theta_{hw}^{contingency}$ weighted hotspot temperatures for contingency load
$\theta_h^{normal}$ hotspot temperature for normal load
$\theta_h^{contingency}$ hotspot temperature for contingency load
$\theta_{o,max}$ limit for top liquid temperature
$\theta_{h,max}$ limit for hot-spot temperature
$\theta_{hw,max}^{normal}$ limit of weighted hot spot temperature at normal load
$\theta_{hw,max}$ contingency limit of weighted hot spot temperature at contingency load
$\lambda_h$ critical value of factor for winding hot-spot temperature
$\lambda_o$ critical value of factor for top liquid temperature
$\lambda_n$ critical value of factor for normal operation
$\lambda_c$ critical value of factor for contingency operation

The invention claimed is:

1. A method for an improved transformer design for a power plant, comprising the steps of:
   i) defining at least two critical temperatures ($\theta_{hw}^{normal}$, $\theta_{hw}^{contingency}$, $\theta_h$, $\theta_0$) in the operation of the transformer, the critical temperature being selected from at least two of a weighted hotspot temperature for normal load ($\theta_{hw}^{normal}$), a weighted hotspot temperature for contingency load ($\theta_{hw}^{contingency}$), a top liquid temperature ($\theta_o$) at maximum load and maximum ambient temperature and a hot spot temperature ($\theta_h$) at maximum load and maximum ambient temperature, and determining limits ($\theta_{hw,max}^{normal}$, $\theta_{hw,max}$ contingency, $\theta h_{,max}$, $\theta_{o,max}$) for the critical temperatures,
   ii) providing a data set of transformer load levels (K, κ) for one or more transformers or for a power plant, wherein the data set comprises the amount of time (H) at a specific load level (K, κ) for a specific ambient temperature ($\theta_a$) during the operation of the one or more transformers or the power plant, iii) providing expressions for the critical temperatures in dependence from the transformer load levels (K, κ) and from design parameters ($\Delta\theta_{hr}$, $\Delta\theta_{or}$, R, x, y) related to a geometrical and/or an electrical design of a transformer,
   iv) adjusting the geometrical and electrical design of the transformer and obtaining adjusted values for the design parameters ($\Delta\theta_{hr}$, $\Delta\theta_{or}$, R, x, y) such that the critical temperature calculated from at least one of the expressions equals the determined limit,
   v) after determining an adjusted design, checking if all other ones of the limits ($\theta_{hw,max}^{normal}$, $\theta_{hw,max}$ contingency, $\theta h_{,max}$, $\theta_{o,max}$) for the critical temperatures ($\theta_{hw}^{normal}$ $\theta_{hw}^{contingency}$, $\theta_h$, $\theta_o$) are observed, and, if this is not the case, iterating the method starting from step iii) and setting the design parameters ($\Delta\theta_{hr}$, $\Delta\theta_{or}$, R, x, y) to their adjusted values,
comprising the step of producing a transformer having the adjusted values of the design parameters ($\Delta\theta_{hr}$, $\Delta\theta_{or}$, R, x, y) and/or using a transformer having the adjusted values of the design parameters ($\Delta\theta_{hr}$, $\Delta\theta_{or}$, R, x, y) in the power plant.

2. The method of claim 1,
wherein when all other limits ($\theta_{hw,max}^{normal}$, $\theta_{hw,max}$ contingency, $\theta h_{,max}$, $\theta_{o,max}$) for the critical temperatures ($\theta_{hw}^{normal}$ $\theta_{hw}^{contingency}$, $\theta_h$, $\theta_o$) are observed by the adjusted design, accepting the design.

3. The method of claim 1,
wherein in step iv) the design is adjusted such that the expression equals the determined limit or differs at most by 10° C. from the determined limit.

4. The method of claim 1, wherein the expression in step iii) further depends on a factor (λ) related to a rating (r) of a transformer design, wherein in step iv) one or more critical values ($\lambda_n$, $\lambda_c$, $\lambda_h$, $\lambda_o$) of the factor (λ) are determined at which the one or more expressions equal their determined limits,
wherein the geometrical and electrical design of the transformer is adjusted such that the expression for the smallest one of the critical values ($\lambda_n$, $\lambda_c$, $\lambda_h$, $\lambda_o$) is at least closer to the determined limit than for the previous design of the transformer.

5. The method of claim 1,
wherein the expression for the weighted hotspot temperature for normal load ($\theta_{hw}^{normal}$) is as follows:

$$\theta_{hw}^{normal} = \left(-\frac{R_g}{E_A}\ln\frac{1}{8766}\sum_{n\kappa}\sum_{n\theta_a}H(\kappa, \theta_a)\cdot\exp\left(\left(-\frac{E_A}{R_g\left(\theta_h^{normal}+273\right)}\right)\right)\right)^{-1} - 273$$

wherein $$\theta_h^{normal} = \theta_a + \Delta\theta_{or}\cdot\left(\frac{1+\left(\frac{N-1}{N}\lambda\kappa\right)^2 R}{1+R}\right)^x + \Delta\theta_{hr}\cdot\left(\frac{N-1}{N}\lambda\kappa\right)^y$$

with the parameters defined as follows:
$E_A$: activation energy
$R_g$: gas constant
H(κ, $\theta_a$): number of hours at specified ambient temperature $\theta_a$ and specified load level κ from input data set
λ: factor
$\Delta\theta_{hr}$: hot-spot-to-top-liquid gradient at rated current
$\Delta\theta_{or}$: top-oil temperature rise at rated losses
R: ratio of load losses to no-load losses at rated conditions
x: liquid exponent depending on cooling mode
y: winding exponent depending on cooling mode.

6. The method of claim 1,
wherein the expression for the weighted hotspot temperature for contingency load ($\theta_{hw}^{contingency}$) is as follows:

$$\theta_{hw}^{contingency} = \left(-\frac{R_g}{E_A}\ln\frac{1}{8766}\sum_{n\kappa}\sum_{n\theta_a}H(\kappa, \theta_a)\cdot\exp\left(\left(-\frac{E_A}{R_g\left(\theta_h^{contingency}+273\right)}\right)\right)\right)^{-1} - 273$$

wherein $$\theta_h^{contingeny} = \theta_a + \Delta\theta_{or}\cdot\left(\frac{1+(\lambda\kappa)^2 R}{1+R}\right)^x + \Delta\theta_{hr}\cdot(\lambda\kappa)^y$$

with the parameters defined as follows:

$E_A$: activation energy $R_g$: gas constant $H(\kappa, \theta_a)$: number of hours at specified ambient temperature $\theta_a$ and specified load level $\kappa$ from input data set $\lambda$: factor $\Delta\theta_{hr}$: hot-spot-to-top-liquid gradient at rated current $\Delta\theta_{or}$: top-oil temperature rise at rated losses R: ratio of load losses to no-load losses at rated conditions x: liquid exponent depending on cooling mode y: winding exponent depending on cooling mode.

7. The method of claim 1, wherein the limit ($\theta_{hw,max}^{normal}$, $\theta_{hw,max}$ contingency, $\theta h_{,max}$, $\theta_{o,max}$) for at least one of the critical temperatures ($\theta_{hw}^{normal}$, $\theta_{hw}^{contingency}$, $\theta_h$, $\theta_o$) is determined by an ageing model depending on ageing parameters (A, $E_A$) based on at least one of a paper type, moisture level and oxygen level for a transformer, degrees of polymerization at the initial time and at the end of life ($DP_{start}$, $DP_{end}$), a specified total lifetime (L) of the transformer and a subset of the lifetime (C) at which the transformer operates at contingency level.

8. The method of claim 1, wherein the data set of transformer loading is provided as the amount of time (H) for a number of ambient temperature discretization steps ($n_{\theta_a}$) and a number of load discretization steps ($n_\kappa$), wherein the sum over the amount of time (H) equals the number of hours in a year.

9. The method of claim 1, wherein the obtained transformer design is configured for a wind power plant.

* * * * *